(12) United States Patent
Lönnqvist et al.

(10) Patent No.: US 10,761,004 B2
(45) Date of Patent: Sep. 1, 2020

(54) FORWARD SCATTER SENSOR

(71) Applicant: Vaisala Oyj, Helsinki (FI)

(72) Inventors: Jan Lönnqvist, Helsinki (FI); Seppo Mäkinen, Helsinki (FI)

(73) Assignee: Vaisala Oyj, Helsinki (FI)

( * ) Notice: Subject to any disclaimer, the term of this patent is extended or adjusted under 35 U.S.C. 154(b) by 0 days.

(21) Appl. No.: 16/591,337

(22) Filed: Oct. 2, 2019

(65) Prior Publication Data

US 2020/0103329 A1 Apr. 2, 2020

(30) Foreign Application Priority Data

Oct. 2, 2018 (EP) .................................. 18198214

(51) Int. Cl.
*G01N 15/04* (2006.01)
*G01N 15/00* (2006.01)

(52) U.S. Cl.
CPC .......... *G01N 15/04* (2013.01); *G01N 2015/03* (2013.01)

(58) Field of Classification Search
CPC ............................. G01N 15/04; G01N 2015/03
USPC ........................................................ 356/338
See application file for complete search history.

(56) References Cited

U.S. PATENT DOCUMENTS

| 3,768,908 A * | 10/1973 | Zaromb | G01J 3/44 356/338 |
| 4,289,397 A * | 9/1981 | Itzkan | G01S 17/95 356/5.01 |
| 5,444,530 A | 8/1995 | Wang | |
| 5,561,515 A * | 10/1996 | Hairston | G01P 5/22 356/28 |
| 5,880,836 A * | 3/1999 | Lonnqvist | G01S 17/95 356/336 |
| 6,914,674 B1 * | 7/2005 | Wang | G01N 21/532 250/573 |

(Continued)

FOREIGN PATENT DOCUMENTS

| DE | 102012102363 A1 | 2/2013 |
| EP | 0664445 A2 | 7/1995 |
| EP | 3246692 A1 | 11/2017 |

OTHER PUBLICATIONS

European Search Report in EP Application No. 18198214.1 dated Apr. 12, 2019.

*Primary Examiner* — Roy M Punnoose
(74) *Attorney, Agent, or Firm* — Maschoff Brennan; Paul G. Johnson

(57) ABSTRACT

An example forward scatter sensor comprises: a transmitter to emit a light sheet; a receiver to observe light scattered from particles that fall through a measurement volume; and a control entity comprising an analyzer to record a measurement signal descriptive of intensity of light captured by the receiver as a function of time and to: carry out a precipitation analysis on basis of a time segment of the measurement signal; carry out a verification of analysis performance based on magnitudes of first peaks of at least one identified double peak and on respective residence times for said at least one identified double peak; and invoke a predefined maintenance action responsive to said verification indicating a threshold-exceeding difference between respective size estimates derived based on magnitudes of the first peak of said at least one identified double peak and based on residence times of said at least one identified double peak.

20 Claims, 5 Drawing Sheets

(56) References Cited

U.S. PATENT DOCUMENTS

| | | | |
|---|---|---|---|
| 7,122,820 B2* | 10/2006 | Engel | G01N 15/0205 |
| | | | 250/574 |
| 9,236,939 B2* | 1/2016 | Wayne | H04B 10/0795 |
| 2017/0010197 A1 | 1/2017 | Tropea et al. | |
| 2020/0103330 A1* | 4/2020 | Heyn | G01N 15/0211 |

* cited by examiner

FORWARD SCATTER SENSOR

CROSS REFERENCE TO RELATED APPLICATION

This application claims the benefit of and priority to European Application No. 18198214.1, filed Oct. 2, 2018, which is incorporated herein by reference.

TECHNICAL FIELD

The present invention relate to operation of a forward scatter sensor for meteorological applications. In particular, non-limiting example embodiments of the present invention relate to providing a forward scatter sensor that enables accurate and reliable precipitation analysis.

BACKGROUND

Sensor devices making use of forward scattering principle are widely employed for atmospheric and meteorological studies, for example for measurement of atmospheric visibility and/or for precipitation measurements. Herein, we refer to such a sensor device as a forward scatter sensor.

The measurements carried out using a forward scatter sensor are based on analysis of the light scattered from particles in the atmosphere: a transmitter sends a conical light beam towards a receiver such that it is offset from a direct path between the transmitter and the receiver, whereas the receiver captures light scattered from the particles in the atmosphere. The receiver provides a signal that is descriptive of the captured light to a processing unit that may then compute meteorological parameters of interest related to visibility and precipitation.

Even though providing a well-working framework for analysis of certain parameters related to visibility and precipitation, known forward scatter sensors provide, however, limited capability for detailed analysis of precipitation while they also provide limited accuracy and reliability especially at low intensity precipitation events. Moreover, a forward scatter sensor for atmospheric and meteorological studies is typically installed outdoors for continuous operation and it may remain operational for several years. The environmental conditions may cause gradual soiling and wear of optical (and other) components of the forward scatter sensor, which in turn degrades accuracy and reliability of the measurement results obtained from the forward scatter sensor. Another factor that may affect the measurement performance of the forward scatter sensor is that due to continuous operation in field conditions it is susceptible to external impacts that may not be sufficient to cause actual damage but that may still have a detrimental effect to the alignment between the transmitter and the receiver, thereby possibly leading to compromised measurement performance.

SUMMARY

Therefore, it is an object for at least some embodiments of the present invention to provide a technique that enables ensuring accuracy and reliability of measurement results of a forward sensor.

According to an example embodiment, a forward scatter sensor for precipitation analysis is provided, the forward scatter sensor comprising: a transmitter arranged to emit a light sheet; a receiver offset from a propagation path of the light sheet and arranged to observe light scattered from particles that fall through a measurement volume defined by an intersection of the propagation path of the light sheet and a field of view of the receiver; and a control entity comprising an analyzer arranged to record a measurement signal that is descriptive of intensity of light captured by the receiver as a function of time, wherein the analyzer is further arranged to: carry out a precipitation analysis on basis of a time segment of the measurement signal, the analysis comprising identifying, in said time segment of the measurement signal, one or more double peaks that each represent a respective droplet and comprise a first peak that represents light refracted from the bottom of the respective droplet upon entry to the measurement volume and a second peak that represents light reflected from the top of the respective droplet upon exit from the measurement volume; carry out a verification of analysis performance based on magnitudes of first peaks of at least one identified double peak and on respective residence times for said at least one identified double peak, wherein the residence time for a given double peak is defined by a time difference between the first and second peaks of the given double peak; and invoke a predefined maintenance action in response to said verification indicating a threshold-exceeding difference between respective size estimates derived based on magnitudes of the first peak of said at least one identified double peak and based on residence times of said at least one identified double peak.

The subject technology of the present invention is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination, and placed into an independent clause, e.g., Clauses 1 and 16. The other clauses can be presented in a similar manner. The following is a non-limiting summary of some examples presented herein.

Clause 1. A forward scatter sensor for precipitation analysis, the forward scatter sensor comprising:
   a transmitter arranged to emit a light sheet;
   a receiver offset from a propagation path of the light sheet and arranged to observe light scattered from particles that fall through a measurement volume defined by an intersection of the propagation path of the light sheet and a field of view of the receiver; and
   a control entity comprising an analyzer arranged to record a measurement signal that is descriptive of intensity of light captured by the receiver as a function of time, wherein the analyzer is further arranged to:
      carry out a precipitation analysis on basis of a time segment of the measurement signal, the precipitation analysis comprising identifying, in said time segment of the measurement signal, one or more double peaks that each represent a respective droplet and comprise a first peak that represents light refracted from a bottom of the respective droplet upon entry to the measurement volume and a second peak that represents light reflected from a top of the respective droplet upon exit from the measurement volume and estimating respective droplet sizes based on said one or more double peaks;
      carry out a verification of analysis performance based on magnitudes of first peaks of at least one identified double peak and on respective residence times for said at least one identified double peak, wherein the residence time for a given double peak is defined by a time difference between the first and second peaks of the given double peak, wherein said verification comprises deriving respective first estimated sizes for droplets represented by said at least one identified double peak based on magnitude of the first peak of the respective double peak and deriving respective second estimated sizes for the droplets represented by said at least one identified double peak based on a residence time indicated by the respective double peak, wherein the residence time is defined as a time difference between the first and second peaks of the respective double peak; and invoke a predefined maintenance action in response to said verification indicating a threshold-exceeding difference between said first and second estimated sizes.

Clause 2. A forward scatter sensor according to clause 1, wherein invoking the predefined maintenance action comprises invoking the predefined maintenance action in response to a difference measure that is indicative of the difference between the first and second estimated sizes indicating a difference that exceeds a predefined difference threshold.

Clause 3. A forward scatter sensor according to clause 1 or 2, wherein:

deriving the first estimated size for a droplet represented by a given double peak comprises using a first mapping function that defines a relationship between a magnitude of the first peak of a double peak and the size of a droplet represented by the double peak, and deriving the second estimated size for the droplet represented by the given double peak comprises using a second mapping function that defines a relationship between the residence time and the size of the droplet.

Clause 4. A forward scatter sensor according to any of clauses 1 to 3, further comprising invoking the predefined maintenance action in response to an average ratio of the first and second estimated sizes for said at least one identified droplet exceeding a first predefined threshold or failing to exceed a second predefined threshold.

Clause 5. A forward scatter sensor according to any of clauses 1 to 4, wherein said predefined maintenance action comprises one of the following:

displaying an error indication via a user interface of the forward scatter sensor; or sending a message comprising an error indication to one or more remote devices.

Clause 6. A forward scatter sensor according to any of clauses 1 to 5, wherein said predefined maintenance action comprises carrying out an adjustment procedure comprising:

computing a correction factor based on an average ratio of the second and first estimated sizes for said at least one identified droplet;

deriving a modified measurement signal by scaling the recorded measurement signal by the correction factor; and carrying out the precipitation analysis on basis of the modified measurement signal.

Clause 7. A forward scatter sensor according to any of clauses 1 to 6, wherein the precipitation analysis further comprises deriving one or more precipitation parameters based at least in part on the identified one or more double peaks.

Clause 8. A forward scatter sensor according to clause 7, wherein deriving one or more precipitation parameters comprise deriving an indication of a number of identified double peaks, and the precipitation analysis further comprises deriving one or more precipitation indications based at least in part on the one or more precipitation parameters, including deriving an indication of presence of liquid precipitation in response to the number of identified double peaks exceeding a first predefined threshold.

Clause 9. A forward scatter sensor according to any of clauses 1 to 8, wherein identifying a double peak in the measurement signal comprises identifying, at time position ti, a first candidate peak that meets a first predefined magnitude criterion and a predefined timespan criterion in time.

Clause 10. A forward scatter sensor according to clause 9, wherein identifying a double peak in the measurement signal further comprises computing an estimated droplet size based on the magnitude of the first candidate peak by using a first mapping function that defines a relationship between a magnitude of the first peak of a double peak and the size of a droplet represented by the double peak.

Clause 11. A forward scatter sensor according to clause 10, wherein identifying a double peak in the measurement signal further comprises:

estimating the residence time $t_r$ for the first candidate peak based on the estimated droplet size by using a second mapping function that defines a relationship between the residence time and the size of the droplet;

identifying a second candidate peak in the measurement signal within a predefined search range around a time position $t_1+t_r$;

if a second candidate peak having a magnitude that meets predefined criteria in relation to the magnitude of the first candidate peak is encountered within said search range, identifying the first and second candidate peaks, respectively, as the first and second peaks of a double peak; and if no second candidate peak having a magnitude that meets the predefined criteria in relation to the magnitude of the first candidate peak is encountered within said search range, not considering the first candidate peak as a peak belonging to a double peak.

Clause 12. A forward scatter sensor according to any of clauses 1 to 11, wherein the transmitter is arranged to emit a single light sheet that has a thickness less than 0.5 millimeters FWHM.

Clause 13. A forward scatter sensor according to any of clauses 1 to 12, wherein the transmitter comprises a line laser comprising:

a laser source for emitting a light beam;

a first lens for converting the light beam into a divergent light sheet; and a second lens for shaping the divergent light sheet into a single light sheet that has a reduced angle of divergence in comparison to the divergent light sheet.

Clause 14. A forward scatter sensor according to any of clauses 1 to 13, wherein the transmitter and the receiver are arranged in a frame such that respective optical axes of the transmitter and the receiver meet each other in an angle that is in a range from 20 to 60 degrees.

Clause 15. A forward scatter sensor according to any of clauses 1 to 14, wherein each of the transmitter and the receiver are arranged in a frame such that respective optical axes of the transmitter and the receiver are inclined downwards from a horizontal plane in angle that is in a range from 10 to 30 degrees when the forward scatter sensor is in an upright position.

Clause 16. A method comprising:
emitting a light sheet;
observing light scattered from particles that fall through a measurement volume defined by an intersection of a propagation path of the light sheet and a field of view;
recording a measurement signal that is descriptive of intensity of observed light as a function of time;
carrying out a precipitation analysis on basis of a time segment of the measurement signal, the precipitation analysis comprising:
identifying, in said time segment of the measurement signal, one or more double peaks that each represent a respective droplet and comprise a first peak that represents light refracted from a bottom of the respective droplet upon entry to the measurement volume and a second peak that represents light reflected from a top of the respective droplet upon exit from the measurement volume; and
estimating respective droplet sizes based on said one or more double peaks;
carrying out a verification of analysis performance based on magnitudes of first peaks of at least one identified double peak and on respective residence times for said at least one identified double peak, wherein the residence time for a given double peak is defined by a time difference between the first and second peaks of the given double peak, wherein said verification comprises deriving respective first estimated sizes for droplets represented by said at least one identified double peak based on magnitude of the first peak of the respective double peak and deriving respective second estimated sizes for the droplets represented by said at least one identified double peak based on a residence time indicated by the respective double peak, wherein the residence time is defined as a time difference between the first and second peaks of the respective double peak; and
invoking a predefined maintenance action in response to said verification indicating a threshold-exceeding difference between said first and second estimated sizes.

Clause 17. The method according to clause 16, wherein invoking the predefined maintenance action comprises invoking the predefined maintenance action in response to a difference measure that is indicative of the difference between the first and second estimated sizes indicating a difference that exceeds a predefined difference threshold.

Clause 18. The method according to clause 16, wherein:
deriving the first estimated size for a droplet represented by a given double peak comprises using a first mapping function that defines a relationship between a magnitude of the first peak of a double peak and the size of a droplet represented by the double peak, and
deriving the second estimated size for the droplet represented by the given double peak comprises using a second mapping function that defines a relationship between the residence time and the size of the droplet.

Clause 19. The method according to clause 16, wherein:
the precipitation analysis further comprises deriving one or more precipitation parameters based at least in part on the identified one or more double peaks;
deriving one or more precipitation parameters comprises deriving an indication of a number of identified double peaks, and
the precipitation analysis further comprises deriving one or more precipitation indications based at least in part on the one or more precipitation parameters, including deriving an indication of presence of liquid precipitation in response to the number of identified double peaks exceeding a first predefined threshold.

Clause 20. The method according to clause 16, wherein:
identifying a double peak in the measurement signal comprises identifying, at time position ti, a first candidate peak that meets a first predefined magnitude criterion and a predefined timespan criterion in time;
identifying the double peak in the measurement signal further comprises computing an estimated droplet size based on the magnitude of the first candidate peak by using a first mapping function that defines a relationship between a magnitude of the first peak of a double peak and the size of a droplet represented by the double peak; and
identifying the double peak in the measurement signal further comprises:
estimating the residence time $t_r$ for the first candidate peak based on the estimated droplet size by using a second mapping function that defines a relationship between the residence time and the size of the droplet;
identifying a second candidate peak in the measurement signal within a predefined search range around a time position $t_i+t_r'$
if a second candidate peak having a magnitude that meets predefined criteria in relation to the magnitude of the first candidate peak is encountered within said search range, identifying the first and second candidate peaks, respectively, as the first and second peaks of a double peak; and
if no second candidate peak having a magnitude that meets the predefined criteria in relation to the magnitude of the first candidate peak is encountered within said search range, not considering the first candidate peak as a peak belonging to a double peak.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where FIG. 1A schematically illustrates some components of a forward scatter sensor according to an example.

DESCRIPTION OF SOME EMBODIMENTS

Figure 1A:
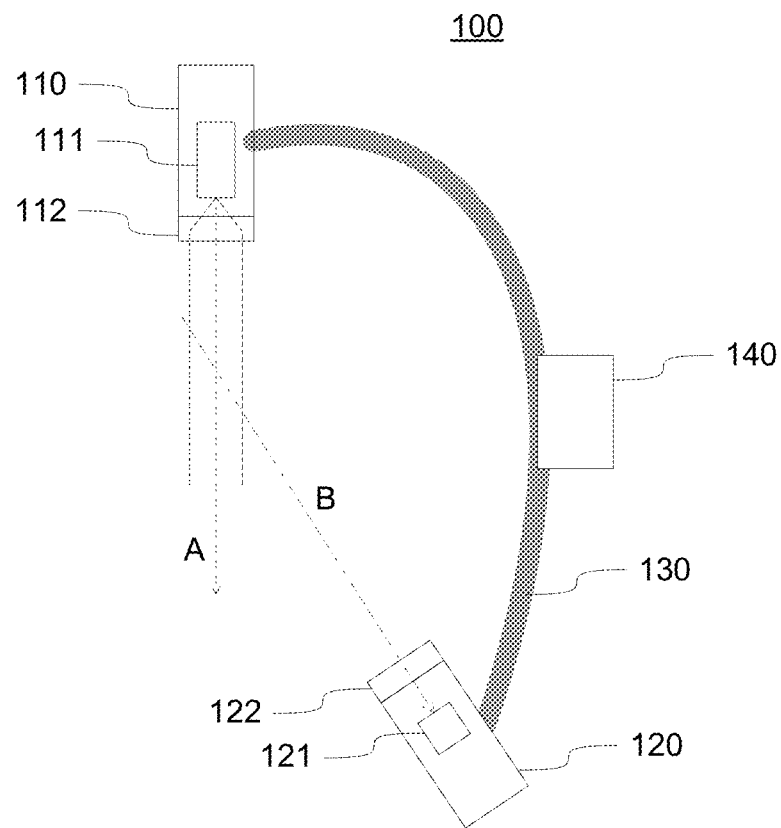
FIG. 1B schematically illustrates some components of a forward scatter sensor according to an example.
Figure 1B:
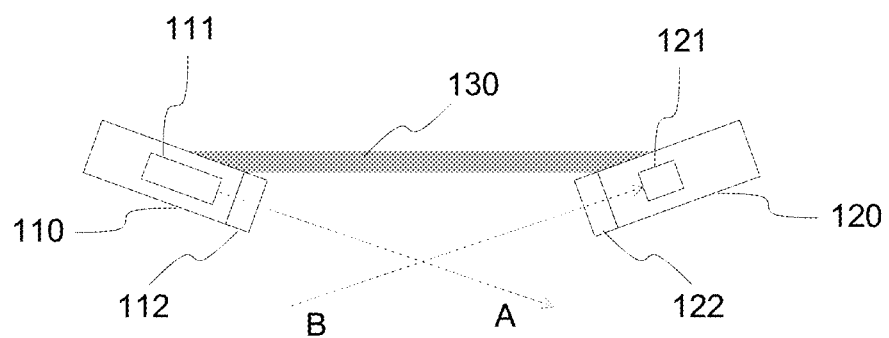

FIG. 1A schematically illustrates a top view of some components a forward scatter sensor 100 according to an example, whereas FIG. 1B schematically illustrates a side view to some components of the forward scatter sensor 100. The respective illustrations of FIGS. 1A and 1B show a transmitter 110 and a receiver 120 mounted in a frame 130. FIG. 1A further shows a control entity 140 for controlling operation of the transmitter 110 and the receiver 120. The control entity 140 is communicatively coupled to the transmitter 110 and to the receiver 120. The coupling between the control entity 140 and the transmitter 110 and the coupling between the control entity 140 and the receiver 120 may be provided, for example, via respective one or more electrical wires and/or one or more optical fibers arranged inside the frame 130 or via a structure attached to the frame 130. The forward scatter sensor 100 is suitable for atmospheric and/or meteorological studies, such as precipitation analysis.

The transmitter 110 is arranged to emit a light beam in a form of a light sheet. In this regard, the transmitter 110 comprises one or more light sources 111 that are arranged to emit light under control of the control entity 140 through an optical system 112 (e.g. an arrangement of one or more lenses and/or one or more mirrors) that is arranged to shape the light originating from the one or more light sources 111 into a light sheet of desired width and thickness. The one or more light sources 111 and the optical system 112 are arranged inside a housing that serves to protect components arranged therein e.g. from moisture and environmental soiling. According to a non-limiting example, the one or more light sources 111 are provided as a respective laser sources. In another non-limiting example, the one or more light sources 111 are provided as a respective light emitting diodes (LEDs). The light emitted from the one or more light sources 111 may be visible light or light that is invisible to a human observer. As a non-limiting example, the transmitter 110 may employ light source(s) 111 that emit light at one or more wavelengths in the range from 750 to 900 nanometers.

Figure 2:
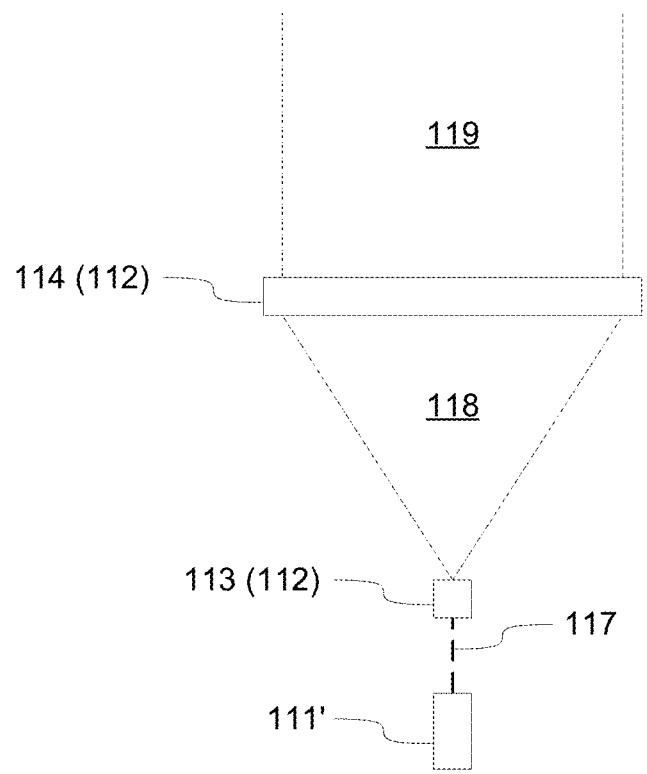
FIG. 2 schematically illustrates some aspects of a line laser according to an example.

In an example, the one or more light sources 111 and the optical system 112 may be provided as a line laser. FIG. 2 schematically illustrates some components of a line laser according to an example, wherein the line laser comprises a laser source 111' for emitting a light beam 117 and a first lens 113 for converting the light beam into a divergent light sheet 118 where the cross-section of the divergent light sheet 118 approximates a line. The first lens 113 may be provided, for example, as a Powell lens or as a Lineman lens. Such line lasers are known in the art. The optical system 112 of the laser line may optionally, further comprise a second lens 118 for shaping the divergent light sheet 118 into a light sheet 119 that has a reduced angle of divergence in comparison to the divergent light sheet 118 and that is provided as the output of the transmitter 110. The second lens 114 may be provided, for example, as a cylindrical lens or a 'condensing' lens of other type. In the example of FIG. 2, the second lens 114 is selected such that it serves to convert the divergent light sheet 118 into a parallel light sheet 119. In other examples, the second lens 114 is selected such that it converts the divergent light sheet 118 into a divergent light sheet 119 that has a reduced angle of divergence in comparison to the divergent light sheet 118 or such that converts the divergent light sheet 118 into a convergent light sheet 119.

The receiver 120 is arranged to observe light scattered from particles that fall through a predefined portion of the propagation path of the light sheet emitted from the transmitter 110. In this regard, scattering may involve light refracted from particles that fall through the predefined portion and/or light reflected from particles that fall through the predefined portion. The receiver 120 comprises one or more light detector elements 121 arranged to capture light arriving thereat through an optical system 122 (e.g. an arrangement of one or more lenses and/or one or more mirrors) that is arranged to transfer the light entering the receiver 120 to the one or more light detector elements 121 that are further arranged to provide one or more detector signals that are descriptive of intensity of the captured light for provision to the control entity 140. The one or more light detector elements 121 and the optical system 122 are arranged in a housing that serves to protect components arranged therein e.g. from moisture environmental soiling. The one or more light detector elements may be provided, for example, as respective photodetector elements or as respective image sensors.

The optical system 122 in the receiver 120 may further comprise an optical filter arranged to pass only light at a predefined wavelength or at a predefined range of wavelengths of interest, e.g. light at wavelengths within a range defined by a predefined minimum wavelength and a predefined maximum wavelength, while preventing light at other wavelengths from entering the one or more detector elements 121. In an example, the range of wavelengths that are able to pass the optical filter (e.g. a pass-band) is the same or substantially the same as the range of wavelengths employed by the one or more light sources 111 of the transmitter 110. In another example, the range of wavelengths that are able to pass the optical filter is broader that the range of wavelengths employed by the one or more light sources 111 of the transmitter 110 such that it includes the range of wavelengths emitted from the transmitter 110.

In order to enable the receiver to have a good sensitivity in observing light scattered from the particles falling through the predefined portion of the light sheet, the transmitter 110 and the receiver 120 are arranged in the frame 130 such that the receiver 120 is offset from a propagation path of the light sheet emitted from the transmitter 110 to avoid optical crosstalk between the transmitter 110 and the receiver 120. Consequently, the receiver 120 is not able to directly observe the light sheet emitted from the transmitter 110 but serves to observe the predefined portion of the propagation path of the light sheet emitted from the transmitter 110. The intersection of a field of view of the receiver 120 and the propagation path of the light sheet emitted from the transmitter 110 defines the predefined portion of the propagation path of the light sheet, which may also be referred to as a measurement volume or a sample volume. With this arrangement of the transmitter 110 and the receiver 120, the latter is able to capture light scattered from precipitation particles within the measurement volume: precipitation particles that fall through the measurement volume cause reflection(s) and/or refraction(s) of light, some of which are captured at the one or more light detector elements in the receiver 120. Each refraction and/or reflection that is captured at the receiver results in a respective local maximum (i.e. 'peak') in the detector signal(s) captured by the one or more light detector elements. The detector signal(s) may be used as basis for deriving a measurement signal that is descriptive of the light scattered from particles that pass through the measurement volume, as described in the following.

As a non-limiting example for accomplishing the above-described arrangement of the transmitter 110 and the receiver 120, the transmitter 110 may be arranged to emit the light sheet in a first predefined direction indicated by an arrow A, which may be considered to represent the principal direction of the propagation path of the light beam emitted from the transmitter 110 and the receiver 120 may be arranged to capture light from a second predefined direction indicated by an arrow B, which may be considered as a principal direction of (scattered) light observable at the receiver 120. The principal propagation direction of the propagation path of the light sheet (the arrow A) may be alternatively referred to as an optical axis of the transmitter 110 or to as a centerline of the light sheet emitted from the transmitter 110, and the principal direction of light observable at the receiver 120 (the arrow B) may be alternatively referred to as an optical axis of the receiver 120 or to as a centerline of the field of view of the receiver 120.

Figure 3A:
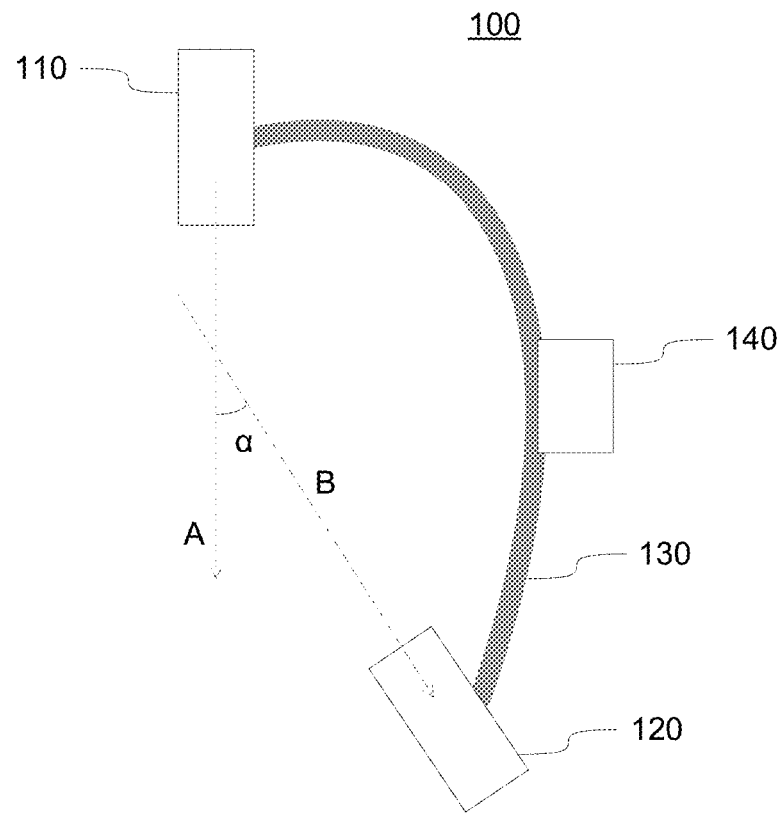
FIG. 3A schematically illustrates some components of a forward scatter sensor according to an example.
Figure 3B:
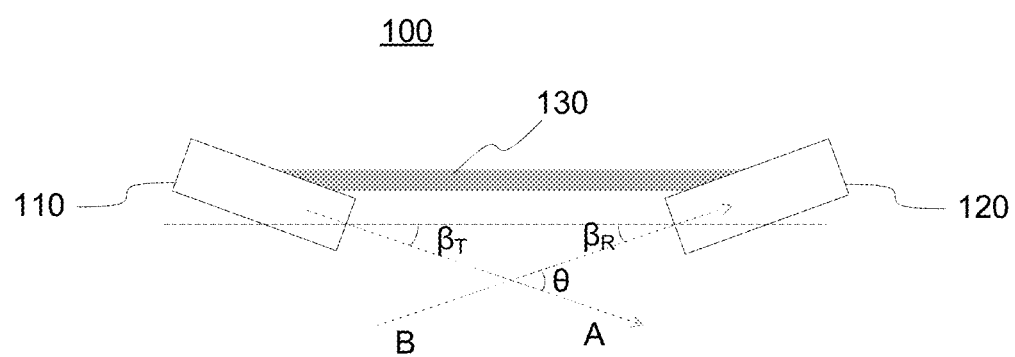
FIG. 3B schematically illustrates some components of a forward scatter sensor according to an example.

FIGS. 3A and 3B schematically illustrates further aspects pertaining to spatial relationship between the transmitter 110 and the receiver 120: FIG. 3A illustrates a top view of some components the forward scatter sensor 100 and FIG. 3B schematically illustrates a side view to some components of the forward scatter sensor 100. Herein, the terms 'top view' and 'side view' refer to an 'upright' position of the forward scatter sensor 100, i.e. the intended usage position of the forward scatter sensor 100. The transmitter 110 and the receiver 120 are arranged in the frame 130 such that angle between their respective optical axes, referred to as a scatter angle and indicated in FIG. 3B by θ, that is preferably in the range from 40 to 45 degrees.

The illustration of FIG. 3A shows an angle α that denotes the horizontal-plane-angle between the principal direction of the light beam emitted from the transmitter 110 indicated by the arrow A and the principal direction of the light observable at the receiver 120 indicated by the arrow B, which may also be considered as an azimuth angle in the horizontal plane. The illustration of FIG. 3B shows angles $\beta_T$ and $\beta_R$, where the angle $\beta_T$ denotes the angle between a horizontal plane and the optical axis of the transmitter 110 indicated by the arrow A and the angle $\beta_R$ denotes the angle between the horizontal plane and the optical axis of the receiver 120 indicated by the arrow B. The angles $\beta_T$ and $\beta_R$ may also be considered as respective slanting angles or inclination angles with respect to the horizontal plane. The desired scatter angle θ defines the selection of the azimuth angle α and the slanting angles $\beta_R$ and $\beta_R$ or, conversely, the resulting scatter angle θ defined via selection of the azimuth angle α and the slanting angles $\beta_R$ and $\beta_R$. According to a non-limiting example, the transmitter 110 and the receiver 120 may be mounted to the frame 130 such that the azimuth angle α is selected from a range from 0 to 20 degrees and each of the slanting angles $\beta_T$ and $\beta_R$ is selected from a range from 10 to 30 degrees such that the resulting scatter angle θ is in the range from 20 to 60 or preferably in the range from 40 to 45 degrees, while experimental studies have indicated that using the scatter angle θ=42 degrees provides optimum performance in terms of detection of precipitation particles of certain type (e.g. snowflakes). Each of the slanting angles $\beta_T$ and $\beta_R$ is preferably selected from a range from 15 to 25 degrees, which helps avoiding environmental soiling of the respective optical systems 112, 122 in the transmitter 110 and in the receiver 120 (e.g. due to the precipitation particles and/or other particles falling through or floating in the measurement volume). If assuming the azimuth angle α=0 degrees, the transmitter 110 and the receiver 120 are facing each other in the horizontal plane and respective projections of their respective optical axes in the horizontal plane are overlapping, whereas the respective optical axes of the transmitter 110 and the receiver 120 are in the same vertical plane and hence the scatter angle θ (in said vertical plane) may be derived as $\theta=\beta_T+\beta_R$. If assuming a non-zero azimuth angle α, the relationship between the azimuth angle α and the slanting angles $\beta_T$ and $\beta_R$ is more complex and the resulting scatter angle $\theta > \beta_T + \beta_R$.

As a non-limiting example, using the azimuth angle α=0 degrees together with the slanting angles $\beta_T = \beta_R = 21$ degrees results in the scatter angle θ=42 degrees. As another non-limiting example, using the azimuth angle α=13 degrees together with the slanting angles $\beta_T = \beta_R = 20$ degrees also results in the scatter angle θ=42 degrees. However, these values serve as non-limiting examples and different values for the angles α, $\beta_T$, $\beta_R$, and/or θ may be employed instead without departing from the scope of the present disclosure. Further considering the slanting angles $\beta_T$ and $\beta_R$, in an alternative design, each of the slanting angles $\beta_T$ and $\beta_R$ may be selected from the range from 0 to 60 degrees such that the resulting scatter angle θ is within the range from 20 to 60 degrees. As described in the foregoing, also in this arrangement of the angles α, $\beta_T$ and $\beta_R$ are selected such the scatter angle θ is preferably within the range from 40 to 45 degrees and most preferably the scatter angle θ=42 degrees is applied.

The distance between the transmitter 110 and the receiver 120 and hence the physical size of the forward scatter sensor 110 is selected according to requirements of the intended usage scenario of the forward scatter sensor 110. As a non-limiting example, a forward scatter sensor 110 designed for precipitation analysis may be designed such that the distance from the optical system 111 of the transmitter 110 (along the arrow A) to (the center of) the measurement volume is approximately in a range from 20 to 50 centimeters (e.g. 30 centimeters) and the distance from (the center of) the measurement volume to the optical system 121 of the receiver 120 is approximately in a range from 20 to 50 centimeters (e.g. 30 centimeters).

As described in the foregoing, the light emitted from the transmitter 110 has predefined shape and size in order to ensure uniform measurement characteristics and hence reliable measurement results by the forward scatter sensor 100. In this regard, as described in the foregoing, the light beam originating from the one or more light sources 111 is shaped by the optical system 112 into a single light sheet that has a substantially uniform height (or 'thickness') both in lateral direction and along its propagation path (i.e. along the optical axis of the transmitter 110 indicated by the arrow A). Moreover, the height of the light sheet is relatively small in comparison to the width of the light sheet. This enables providing a light sheet of collimated light where the light energy distribution is substantially uniform in the lateral direction of the light sheet (e.g. a 'top hat' distribution).

Consequently, the resulting measurement volume is relatively thin and it has substantially uniform light energy distribution, which causes a particle of certain size to result in a substantially similar response (e.g. one or more local maxima) in the measurement signal when passing through the measurement volume regardless of its position of entry to or exit from the measurement volume. Moreover, due to shaping the light beam originating from the one or more light sources 111 into the light sheet, intensity (e.g. power density) of light emitted from the transmitter 110 is high in comparison to that of a traditional conical light beam. This increases relative magnitude of a response (e.g. a local maximum) in the measurement signal caused by a particle passing through the measurement volume, which enables also observing, at the receiver 120, small particles that might otherwise result in a response having a magnitude so small that is masked by optical and/or electrical noise. Hence, shaping the light beam originating from the one or more light sources 111 into the light sheet facilitates accurate and reliable detection of precipitation particles and, consequently, accurate and reliable analysis of precipitation characteristics.

As non-limiting example, the optical system 112 may be arranged to shape the light emitted from the one or more light sources 111 into a light sheet that has a height (or thickness) less than 0.5 millimeters FWHM (full width at half maximum), whereas the height (or thickness) of the light sheet is preferably less than 0.2 millimeters FWHM. According to a non-limiting example, the width of the light sheet (in the area of the measurement volume) is in the range from 10 to 80 millimeters FWHM, while a specific example of a suitable width is approximately 60 millimeters FWHM. Such optical systems 112 are known in the art and, as described in the foregoing, may be provided e.g. by using commercially available line lasers.

Figure 4:
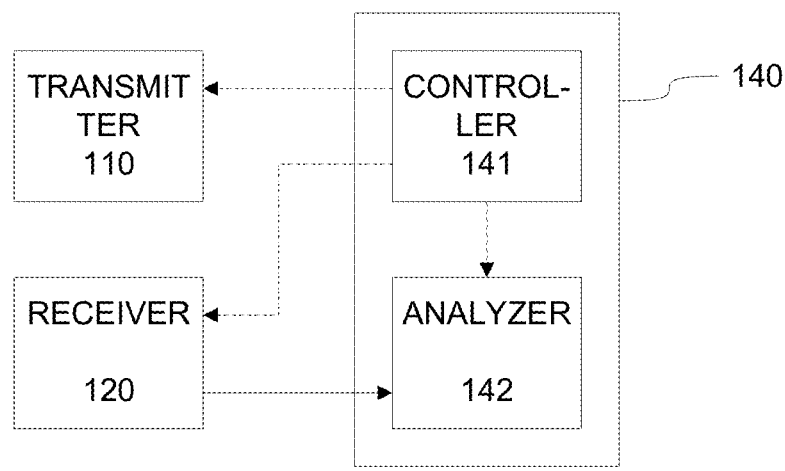
FIG. 4 illustrates a block diagram of some components of a control entity according to an example.

FIG. 4 illustrates a block diagram of some components of the control entity 140 according to an example. The control entity 140 comprises a controller 141 and an analyzer 142. The controller 141 is arranged to control emission of the light sheet from the one or more light sources 111 in the transmitter 110 and to control recording of a measurement signal that is descriptive of intensity of light captured by at the receiver 120 as a function of time. The measurement signal may be recorded, by the analyzer 142, based on the one or more detector signals received from the one or more light detector elements 121 of the receiver 120. As a few examples, the measurement signal may be derived from multiple detector signals as a sum, as an average or as another predefined linear combination of the detector signals. The detector signal(s) and the measurement signal represent intensity of light captured by the receiver 120 as a function of time and are hence descriptive of precipitation particles that fall through the measurement volume: a precipitation particle that passes (e.g. falls) through the measurement volume refracts and/or reflects the light originating from the transmitter 110 in a manner that depends on various characteristics of the particle, e.g. the shape of the particle, size of the particle and/or falling speed of the particle. At least part of these reflections are captured by the one or more light detector elements 121 in the receiver 120 and they appear as corresponding local maxima (i.e. 'peaks') in the detector signal(s) and, consequently, in the measurement signal derived on basis of the detector signal(s).

The controller 140 may be arranged to control the one or more light sources 111 of the transmitter 110 to continuously transmit the light sheet and to control the analyzer 142 to continuously record the measurement signal. Optionally, the controller 140 may be arranged to control the one or more light sources 111 of the transmitter 110 to transmit intensity modulated light sheet and to control the analyzer 142 to record the measurement signal in synchronization with modulation of the light sheet. This enables improvement in signal-to-noise-ratio of the measurement signal, which in turn enables detection of precipitation particles via analysis of the measurement at improved accuracy and reliability. In an example, the applied intensity modulation comprises pulsed modulation at a predefined modulation frequency. The modulation frequency may be selected in accordance with the intended usage of the forward scatter sensor 100 and/or in view of the desired detection performance. Preferably, the modulation frequency is sufficient to ensure reliable detection and analysis of all precipitation particles regardless of their size and speed, including precipitation particles that pass (e.g. fall) through the measurement volume at a high velocity and hence reside within the measurement volume for a very short period of time (e.g. some tenths of a millisecond). In other words the modulation frequency is preferably high enough to avoid any droplets from falling through the measurement volume during non-active periods of the transmitter 110 due to the intensity modulation. Typically, the modulation frequency is 2 kHz or higher, while in some examples the modulation frequency may be up to hundreds of kHz. The modulation frequency may be a fixed or it may be variable.

The analyzer 142 may be arranged to carry out a precipitation analysis on basis of a time segment of the measurement signal, where the precipitation analysis comprises deriving one or more precipitation parameters that are descriptive of precipitation represented by the measurement signal during a time period corresponding the analyzed segment. Non-limiting examples of such precipitation parameters include the following: the number of identified precipitation particles, respective sizes of the identified precipitation particles, respective falling speeds of the identified precipitation particles, respective types of the identified precipitation particles (e.g. liquid or frozen particles), etc. The precipitation analysis by the analyzer 142 may further comprise deriving, based at least in part on the one or more precipitation parameters, one or more precipitation indications associated with the time period corresponding to the analyzed time segment of the measurement signal. Non-limiting examples of such precipitation indications include the following: an indication of presence of precipitation (e.g. precipitation/no precipitation), an indication of detected precipitation type (e.g. liquid precipitation or frozen precipitation), an indication of precipitation intensity, an indication of accumulated precipitation, an indication of liquid water content, precipitation particle size distribution, etc.

Figure 5:
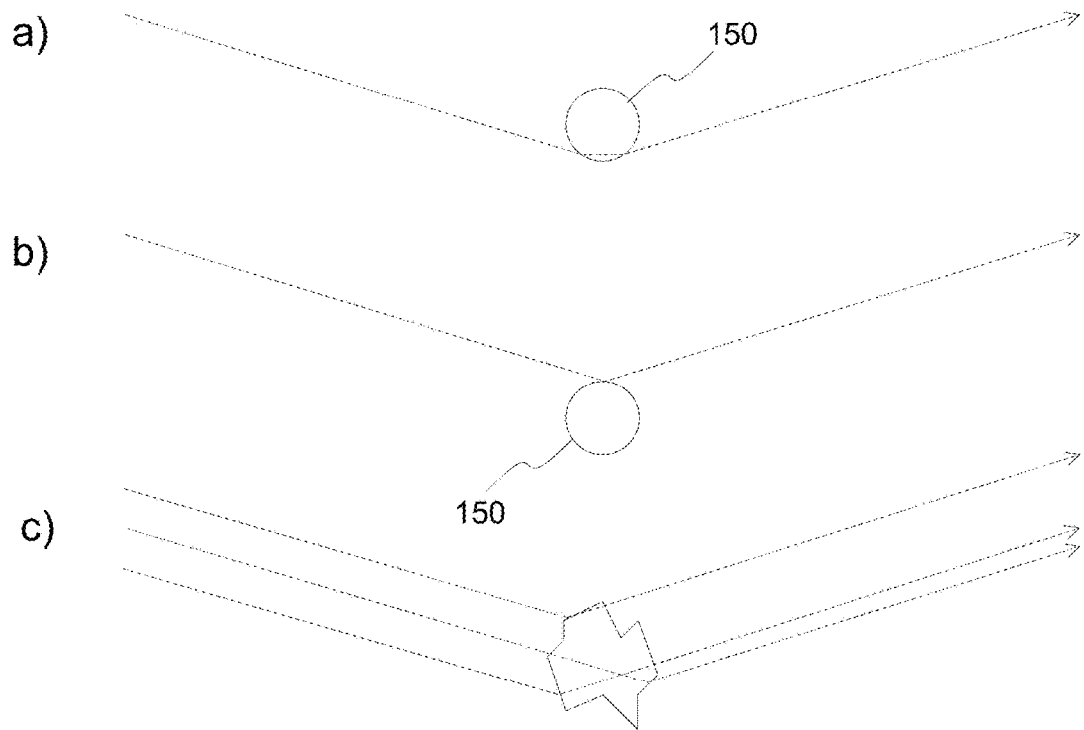
FIG. 5 schematically illustrates scattering of light from precipitation particles according to respective examples.

FIG. 5 schematically illustrates a relationship between a single liquid precipitation particle, i.e. a droplet, and resulting local maxima in the detector signal(s) and in the measurement signal. As shown in the illustrations (a) and (b) of FIG. 4, a droplet 150 falling through the measurement volume results in two local maxima in the measurement signal: the first one (illustration (a)) results from the droplet 150 entering the measurement volume, thereby creating a refraction of light rays from its bottom that results in a relatively high local maximum in the measurement signal. The second one (illustration (b)) results from the droplet 150 exiting the measurement volume, thereby creating a reflection of light rays from its top that results in a relatively low local maxima in the measurement signal. Hence, these two local maxima constitute a signal event (or a signature) that represents the droplet 150 in the measurement signal. Herein, a local maxima in the measurement signal is also referred to as a peak or as a pulse, whereas the combination of the two local maxima resulting from the refraction-reflection pair caused by a single droplet falling through the measurement volume is referred to as a double peak. Respective durations (i.e. 'widths') of the first and second peak of a double peak depend on the size of the droplet the double peak represents, but are typically in the range from 50 to 100 microseconds FWHM.

FIG. 5 further depicts, in the Illustration (c), a relationship between a snowflake and a resulting signal event in the measurement signal: while falling through the measurement volume, a snowflake causes multiple reflections from surfaces of the snowflake, and these reflections result in a period of magnitude variations in the measurement signal, which period constitutes a signal event (or a signature) that represents the snowflake in the measurement signal. The extent and frequency of magnitude variations within such a signal event depends on fine structure of the shape of the snowflake, whereas the duration of the signal event represents the falling speed of the snowflake. Nevertheless, the signal event caused by the snowflake exhibits a signature that involves magnitude variation that is clearly distinct from the double peak and that is significantly longer in time (approx. 60 times the duration of the double peak).

Figure 6:
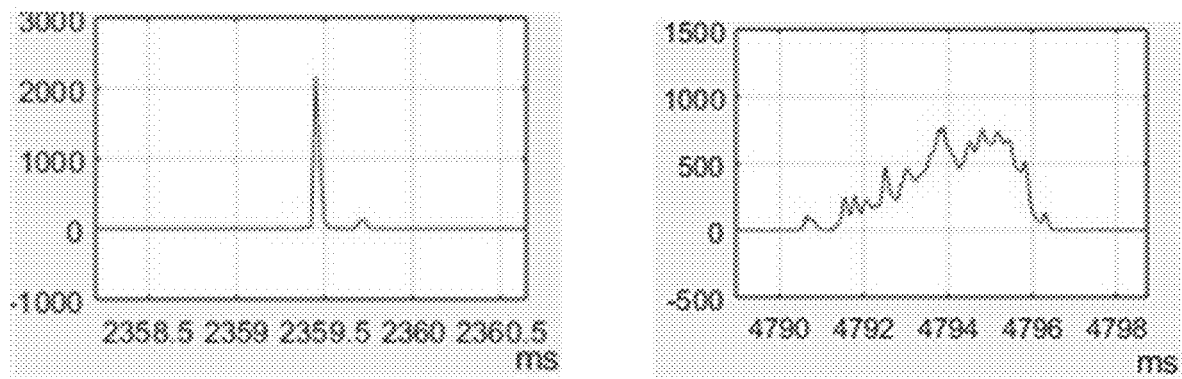
FIG. 6 illustrates signal events arising from a liquid precipitation particle and a frozen precipitation particle according to respective examples.

FIG. 6 provides a comparison of exemplifying signal events (or signatures) arising from a liquid precipitation particle such as a droplet (the graph on the left) and from a snowflake (the graph on the right). Other non-liquid precipitation particles typically result in respective signal events that resemble that resulting from the snowflake, although e.g. in case of a hailstone or an ice pellet the duration of the signal event may be significantly shorter due to its higher falling speed. Therefore, a signal event that is identified as a double peak serves as an indication of a single liquid precipitation particle and a signal event that involves magnitude variations of different characteristics serves as an indication of a single frozen precipitation particle. Moreover, the analyzer 142 may be configured to make use of the double peak phenomenon such that it considers presence of signal events that are recognized as double peaks in the measurement signal as an indication of liquid precipitation (such as rain or drizzle) whereas it considers presence of signal events consisting of amplitude variations that are not recognized as double peaks as an indication of solid precipitation (e.g. snow or hail).

Figure 7:
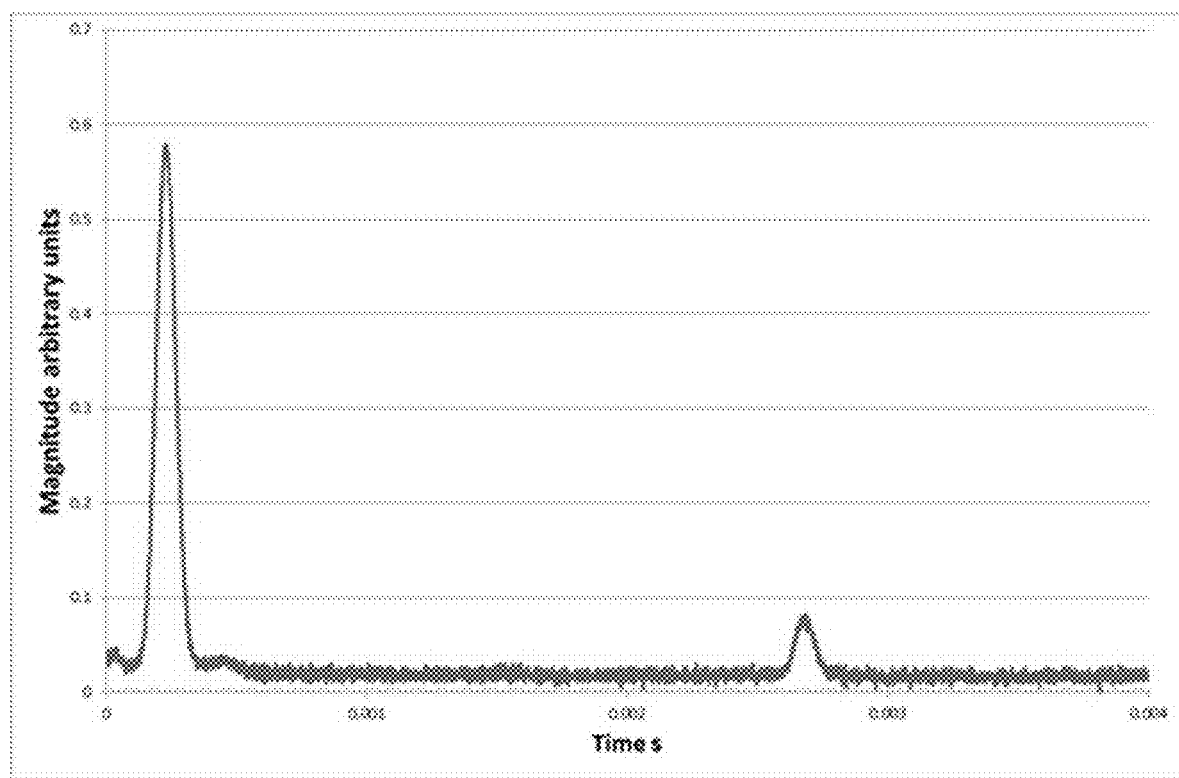
FIG. 7 illustrates a signal event in a measurement signal arising from a liquid precipitation particle according to an example.

FIG. 7 illustrates a more detailed example of a signal event in the measurement signal that includes a double peak resulting from the droplet 150 entering the measurement volume (from above) and the droplet 150 exiting the measurement volume (to below), where the x axis represents time (in milliseconds) and they axis represents relative magnitude of the measurement signal. Therein, the first peak of the illustrated double peak, i.e. the one that arises from the refraction from the bottom of a droplet, has its maximum at approximately 0.25 milliseconds and has relative magnitude approximately 0.58, while the second peak of the illustrated double peak, i.e. the one that arises from the reflection from the top of the droplet, has its maximum at approximately 2.7 milliseconds and has relative magnitude approximately 0.08. Hence, in this example the first peak of the illustrated double peak is roughly an order of magnitude higher than the second peak, whereas the time span between the first and second peaks of the illustrated double peak is approximately 2.5 milliseconds. In general, for a double peak resulting from a droplet the magnitude of the first peak is from 5 to 20 times that of the second peak.

An inherent characteristic of a double peak resulting from the refraction-reflection pair caused by a single droplet falling through the measurement volume is that time difference between the first peak and the second peak of a given double peak corresponds to the time it takes for the droplet represented by the given double peak to fall a distance that is equal or substantially equal to the thickness (or height) of the light sheet. Herein, we refer to this time measure as a residence time (of the droplet). With knowledge of the thickness (height) of the measurement volume the residence time enables estimating the falling speed of the droplet. Moreover, the terminal velocity of a droplet follows a predefined function of droplet size (see for example an article by Ross Gunn and Gilbert D. Kinzer titled "The Terminal Velocity of Fall for Water Droplets in Stagnant Air", Journal of Meteorology, Vol. 6, August 1949), while for practical purposes it is safe to assume that a precipitation particle has reached its terminal velocity when passing through the measurement volume. Consequently, an estimate of the droplet size (e.g. a diameter) may be derived on basis of the falling speed of the droplet via a predefined function of droplet size.

Practical experiments have shown that the magnitude (i.e. 'height') of the first peak in a double peak resulting from the refraction-reflection pair caused by a given droplet is directly proportional to the (maximum) cross-section area of the given droplet. Hence, also the magnitude of the first peak is indicative of the size of the given droplet. Practical experiments have further shown that the time span between the leading edge and the trailing edge of the first peak of a double peak resulting from a single droplet at 50% of the peak magnitude equals or approximately equals the height of the measurement volume (e.g. the 'height' or 'thickness' of the light beam).

Using the above observation of the relationship between the magnitude of the first peak of a double peak in the measurement signal and the droplet size it is possible to pre-calibrate the forward scatter sensor 100 operation e.g. upon its manufacturing or installation by deriving a (first) mapping function that defines the relationship between the magnitude of the first peak of a double peak resulting from a given droplet into a parameter that is descriptive of the size of the given droplet for peaks of different magnitudes (and hence for droplets of different size). In this regard, the parameter descriptive of the droplet size may comprise, for example, the diameter of the droplet or the (maximum) cross-section area of the droplet.

As a non-limiting example, the (first) mapping function may be created via a pre-calibration procedure that involves operating the forward scatter sensor 100 in field conditions to allow droplets of known sizes to fall through the measurement volume and at the same time using the analyzer 142 to record respective peak magnitudes. In such a procedure, the sizes of the droplets may be known e.g. via usage of another precipitation sensor device. Consequently, the recorded pairs of the droplet size and peak magnitude may be applied to define the (first) mapping function that defines the relationship between the magnitude of the first peak of a double peak resulting from a droplet and the size (e.g. the diameter or cross-sectional area) of the droplet for droplet sizes across a range of interest. As another non-limiting example, the (first) mapping function may be created via an optical simulation, so called ray tracing, known in the art. The (first) mapping function so obtained may be applied by the analyzer 142 in the course of subsequent operation of the forward scatter sensor 100 for estimating the droplet sizes based on respective magnitudes of the first peak of double peaks identified in the measurement signal.

Due to the relationship between the falling speed of a droplet and the droplet size described in the foregoing, there is also a predefined relationship between the droplet size and the residence time (i.e. the temporal distance between the first and second peaks of a double peak), and the analyzer 142 may apply a second predefined mapping function that defines the relationship between the residence time and the droplet size. The second mapping function may enable estimating the droplet size on basis of the residence time and/or estimating the residence time on basis of the droplet size. In the analyzer 142, the second mapping function may be applied, for example, to estimate the residence time for a double peak representing a given droplet on basis of an estimated size of the given droplet that is derived using the first mapping function.

As described in the foregoing, the analyzer 142 may be arranged to carry out precipitation analysis on basis of a time segment of the measurement signal that represents a time period of interest, where the precipitation analysis comprises deriving one or more precipitation parameters that are descriptive of precipitation represented by the measurement signal during a time period corresponding the analyzed segment. As an example, the precipitation analysis may be carried out repeatedly for (non-overlapping) time segments of the measurement signal where each time segment represents one minute of the measurement signal. Herein, one minute serves as a non-limiting example of time segment duration and any other suitable time segment duration may be applied instead, e.g. value from the range 5 seconds to 10 minutes may be applied.

In an example, the precipitation analysis relies on the magnitude (i.e. 'height') of the first peak in a double peak as the primary basis for estimating sizes of precipitation particles represented by double peaks in the measurement signal during normal operation of the forward scatter sensor 100. Using the magnitude and timespan of the first peak (instead of the residence time) to estimate the droplet size is advantageous since this information enables also detecting small droplets that may not generate the second peak (and hence appear in the measurement signal as isolated peaks instead of a double peak) and since this information readily enables detecting also signal events that represent precipitation particles other than droplets.

As an example, the precipitation analysis for a time segment of the measurement signal under study may comprise an attempt to identify one or more signal events that comprise respective double peaks in the time segment of the measurement signal under study and derivation of one or more precipitation parameters based at least in part on the one or more identified double peaks. Various techniques may be applied for identifying a double peak. In a non-limiting example, the identification of a single double peak may include the following steps:

a) identify a first candidate peak that meets a first predefined magnitude criterion (e.g. that has a magnitude that exceeds a first predefined magnitude threshold $A_1$) and a predefined timespan criterion (e.g. that spans time that is less than a first predefined time threshold $T_1$) within the segment of the measurement signal at time position $t_1$, b) compute an estimated droplet size d based on the magnitude of the first candidate peak using the first mapping function, c) estimate the residence time $t_r$ based on the estimated droplet size d using the second mapping function, d) identify a second candidate peak in the measurement signal within a predefined search range around a time position $t_1+t_r$, e) if a second candidate peak having a magnitude that meets predefined criteria in relation to the magnitude of the first candidate peak is encountered at position $t_2$ within said search range, identify the first and second candidate peaks, respectively, as the first and second peaks of a double peak that represents a droplet of size d at time position from $t_1$ to $t_2$;

f) if no second candidate peak having a magnitude that meets the predefined criteria in relation to the magnitude of the first candidate peak is encountered within said search range, do not consider the first candidate peak as a peak belonging to a double peak.

The above procedure from a) to f) (or another procedure) to identify a single double peak may be repeated until each peak of the time segment of measurement signal under study that meets the first predefined magnitude and timespan criteria has been analyzed. The magnitude threshold $A_1$ and the time threshold $T_1$ referred to above in step a) as well as the predefined search range referred to above in step d) may be set, for example, to respective suitable values based on experimental results and/or based on simulation data. Consequently, the analyzer 142 may derive and/or record precipitation parameters obtained via the double peak identification procedure for further analysis therein or by another entity. In this regard, the obtained precipitation parameters may include the estimated droplet size d and the respective time positions $t_1$ and $t_2$ of the first and second peak for each identified double peak (and hence for each identified droplet) within the time segment of the measurement signal under study. Herein, the difference $t_r=t_2-t_1$ for a given droplet serves to indicate the residence time for the given droplet.

In a variation of the above example, the identification of a single double peak may only involve the steps a) and b) while the steps c) to f) are omitted and each first candidate peak that meets the respective criteria with respect to its magnitude and timespan is considered to represent the first peak of a double peak. In such a variation it is assumed that each identified first candidate peak represents a droplet at a sufficiently high probability. While this variation may be considered to partially compromise reliability and/or accuracy of the analysis, in many scenarios the resulting reliability and accuracy are sufficient to justify omitting the steps c) to f) in order to reduce computation required by the analysis. In a further variation, even the step b) may be omitted, in case the analysis only aims at finding out the number of double peaks and hence the number of droplets represented by the time segment of the measurement signal under study.

As another example, alternatively or additionally, the precipitation analysis for the time segment of the measurement signal under study may comprise an attempt to identify one or more signal events that comprise a respective time period of magnitude variations in the measurement signal. Various techniques for signal event identification may be applied, whereas according to a non-limiting example the identification of a single signal event including a period of magnitude variations may comprise the following steps:

1) identify a sub-period of the measurement signal position $t_3$ to position $t_4$ where magnitude of the measurement signal meets a second predefined magnitude criterion (e.g. a sub-period that has a magnitude that continuously exceeds a second predefined magnitude threshold $A_2$ and/or that has an average magnitude that exceeds a third predefined magnitude threshold $A_3$),
2) if the time period from $t_3$ to $t_4$ exceeds a predefined duration $T_2$, identify this time period as a signal event that represents a frozen precipitation particle;
3) if the time period from $t_3$ to $t_4$ fails to exceed the predefined duration $T_2$, do not identify this time period as a signal event.

The signal event identification according to the steps 1) to 3) above (or by another procedure) may be repeated over the time segment of the measurement signal under study. The magnitude threshold $A_2$ and/or the magnitude threshold $A_3$ referred to above in step 1) and the duration $T_2$ referred to above in steps 2) and 3) may be set, for example, to respective suitable values based on experimental results and/or based on simulation data Consequently, the analyzer 142 may record precipitation parameters obtained via the signal event identification procedure for further analysis therein or by another entity. In this regard, the obtained precipitation parameters may include the time positions $t_3$ and $t_4$ for each signal event so identified (and hence for each identified frozen precipitation particle) within the time segment of the measurement signal under study. Moreover, the analyzer 142 may further record, for each identified signal event, a parameter that is descriptive of magnitude within the respective identified signal event. An example in this regard is an average magnitude within the respective time period from $t_3$ to $t_4$.

As described in the foregoing, the precipitation analysis may further involve deriving one or more precipitation indications based at least in part on the precipitation parameters derived by the analyzer 142. As an example in this regard, the analyzer 142 may derive an indication of precipitation type on basis of the precipitation parameters derived using the above-described procedures. Precipitation type identification may comprise one or more of the following:

indicate presence of liquid precipitation in response to the number of identified double peaks (and hence the number identified droplets) exceeding a first threshold;
indicate presence of frozen precipitation in response to the number of identified signal events including a respective period of magnitude variations (and hence the number of identified frozen precipitation particles) exceeding a second threshold.

Consequently, the above indications may serve to indicate absence of precipitation, liquid-only precipitation (e.g. rain or drizzle), frozen-only precipitation (e.g. snow or hail) or mixed precipitation (e.g. rain together with snow).

Hence, identification of the double peaks and the signal events that involve (prolonged) period of magnitude variations in the measurement signal facilitates computationally efficient and reliable approach for distinguishing between liquid precipitation and frozen precipitation or identifying a combination of the two and thereby identifying the precipitation type at least on a coarse level. Alternatively or additionally, the precipitation parameters that serve to characterize the identified double peaks in the measurement signal enable derivation of a number of other precipitation parameters or precipitation indications at least in part on basis of the precipitation parameters derived via the precipitation analysis described in the foregoing. In this regard, the analyzer 142 may be arranged to derive, for example, one or more of the following:

An indication of droplet size distribution during the time period represented by the time segment of the measurement signal under study. This may be derived e.g. based on the computed droplet sizes d derived for the respective double peaks.
An indication of precipitation intensity (e.g. accumulated precipitation) during the time period represented by the time segment of the measurement signal under study. This may be derived based on the number and respective sizes d of identified droplets, e.g. based on the sum of the computed droplet sizes d derived for the respective double peaks.
An indication of falling speeds of droplets during the time period represented by the time segment of the measurement signal under study. This may be derived e.g. based on the droplet sizes d and/or the residence times derived for respective double peaks.

The controller 141 may report one or more of the derived precipitation parameters and/or one or more of the precipitation indications derived therefrom to one or more users e.g. by displaying the results of the precipitation analysis on a display provided as part of a user interface of the forward scatter sensor 100 and/or by transmitting the results of the precipitation analysis using a communication means available in the forward scatter sensor 100 to one or more remote sites for displaying to one more users therein.

Since the forward scatter sensor 100 is typically installed outdoors for continuous operation and it may remain operational for a relatively long period of time (up to several years), the environmental conditions may cause gradual contamination, soiling and/or wear of optical (and other) components of the forward scatter sensor 100, which in turn degrade accuracy and reliability of the measurement results obtained therefrom. Similar consequences may arise from external impacts that may not be sufficient to cause actual damage to the forward scatter sensor 100 but that may still have a detrimental effect e.g. to the alignment between the transmitter 110 and the receiver 120 and/or any components thereof, thereby possibly leading to compromised measurement performance or even erroneous operation.

As described in the foregoing, a double peak resulting in the measurement signal from the refraction-reflection pair caused by a single droplet falling through the measurement volume enables two different approaches for estimating size of the droplet:

the droplet size may be estimated based on the magnitude of the first peak of the double peak e.g. via usage of the first mapping function described in the foregoing;
the droplet size may be estimated based on the residence time derived for the droplet e.g. via usage of the second mapping function described in the foregoing.

The analyzer 142 may be arranged to make use of these two different ways of estimating the droplet size to carry out a verification procedure based on one or more double peaks identified in the measurement signal, e.g. based on magnitudes of first peaks of at least one identified double peak and on respective residence times for said at least one identified double peak, wherein the residence time for a given double peak is defined by a time difference between the first and second peaks of the given double peak. Moreover, the analyzer 142 may be arranged to invoke a predefined maintenance action in response to the verification procedure indicating a threshold-exceeding difference between respective size estimates derived based on magnitudes of the first peak of said at least one identified double peak and based on residence times of said at least one identified double peak indicating. As an example, the verification procedure may include deriving respective first estimated sizes for droplets represented by said at least one identified double peak based on magnitude of the first peak of the respective double peak, and deriving respective second estimated sizes for the droplets represented by said at least one identified double peak based on a residence time indicated by the respective double peak, whereas invoking the predefined maintenance action is carried out in response to a difference measure that is indicative of the difference between the first and second estimated sizes indicating a difference that exceeds a predefined difference threshold.

As an example, the controller 141 may be arranged to cause the analyzer 142 to carry out verification of the analysis performance, for example, automatically at predefined time intervals, automatically at predefined time instants and/or in response to user input received via a user interface of the forward scatter sensor 100 or via a communication means of the forward scatter sensor 100.

In consideration of a single identified droplet, the verification may include computing a first estimated size di for a droplet represented in the measurement signal by a given double peak based on the magnitude of the first peak of the given double peak using the first mapping function; and computing a second estimated size $d_2$ for the droplet represented by the given double peak based on the residence time derived for the given double peak.

Moreover, the verification may include, after having computed the first and second estimated sizes $d_1$, $d_2$ for a plurality of double peaks (and hence for a plurality of droplets), invoking the predefined maintenance action in response to a difference measure that is indicative of the differences between the first and second estimated sizes $d_1$, $d_2$ computed separately for a plurality of double peaks indicating a difference that exceeds a predefined difference threshold.

In the procedure outlined above, the difference measure that is indicative of the difference between the estimated sizes $d_1$ and $d_2$ may comprise, for example, an average of absolute differences between $d_1$ and $d_2$ (e.g. $|d_1 d_2|$) computed for the individual double peaks. In another example, the difference measure may comprise an average of the squared differences between $d_1$ and $d_2$ (e.g. $(d_1 d_2)^2$) computed for the individual double peaks. In both these examples a predefined difference threshold D may be applied, where the difference threshold D may be selected accordingly to indicate an allowable difference that is still considered to represent undisturbed operation of the forward scatter sensor 100. In a further example, the difference measure may comprise an average of ratios of $d_1$ and $d_2$ (e.g. $d_1/d_2$ or $d_2/d_1$) computed for the individual double peaks. In this example, two predefined difference thresholds may be applied, e.g. a first predefined threshold $D_1$ and a second predefined threshold $D_2$ (where $D_1>1$ and $D_2<1$) that are selected accordingly to indicate an allowable difference that is still considered to represent undisturbed operation of the forward scatter sensor 100. The difference measure is considered to indicate a difference that exceeds the difference threshold in response to the average of the ratios of $d_1$ and $d_2$ exceeding the threshold $D_1$ or failing to exceed the threshold $D_2$.

In an example, the predefined maintenance action referred to in the foregoing may comprise the controller 141 operating to display a warning indication or an error indication via an user interface of the forward scatter sensor 100. In another example, the predefined maintenance action comprises the controller 141 sending a message that comprises a warning indication or an error indication to one or more remote devices using the communication means available in the forward scatter sensor 100 to enable displaying the warning or error indication therein. The warning or error indication may be displayed, for example, by showing a predefined symbol or text on a display provided as part of a user interface of the forward scatter sensor 100 or a display of a remote device, or by activating a dedicated warning or error indication arranged in the forward scatter sensor 100 or the remote device (e.g. a dedicated light that serves to indicate a warning or error).

The warning or error indication readily indicates for a user of the forward scatter sensor (e.g. a member of maintenance personnel) that there is likely a need for a human intervention to verify and ensure correct operation of the forward scatter sensor 100. Alternatively or additionally, the predefined maintenance action may comprise the controller 141 causing the analyzer 142 to carry out an adjustment procedure in order to ensure undisturbed operation of the forward scatter sensor in an automated manner. According to an example, the adjustment procedure comprises deriving a correction factor go on basis of respective first and second estimated sizes $d_1$ and $d_2$ computed for a plurality of double peaks and modifying the operation of the analyzer 142 such that the measurement signal is multiplied by the correction factor go to derive a modified measurement signal and carrying out the precipitation analysis on basis of the modified measurement signal. In an example, the correction factor $g_c$ is derived as an average of the ratios of the second estimated size $d_2$ and the first estimated size $d_1$, e.g. $g_c=d_2/d_1$ computed for a plurality of individual double peaks. Automated invocation of the adjustment procedure in response to the threshold-exceeding difference between respective size estimates derived based on magnitudes of the first peak of said at least one identified double peak and based on residence times of said at least one identified double peak may be considered as an autocalibration procedure that provides the additional benefit of avoiding human intervention in ensuring correct operation of the forward scatter sensor 100, thereby reducing the need for or even completely avoiding maintenance work to account for gradual loss of performance that typically occurs over time due to outdoor use in field conditions.

The analyzer 142 may be, alternatively or additionally, arranged to carry out visibility analysis at least in part based on double peaks identified in the measurement signal and/or on precipitation parameters derived by the precipitation analysis described in the foregoing. In this regard, the analyzer 142 may be arranged to estimate an extinction coefficient at least in part based on double peaks identified in the measurement signal and/or on precipitation parameters derived by the precipitation analysis described in the foregoing. In particular, the visibility analysis may involve estimation of a precipitation particle related portion of an extinction coefficient. The extinction coefficient is descriptive of attenuation of light in the atmosphere, and the precipitation particle related portion of an extinction coefficient is descriptive of attenuation of light due to precipitation particles. The extinction coefficient may be, alternatively, referred to as an attenuation coefficient.

Together with a non-precipitation related portion of the extinction coefficient the total extinction coefficient may be calculated as a sum or as another linear combination of the precipitation particle related portion of an extinction coefficient and the non-precipitation related portion of the extinction coefficient. The calculation may involve weighting of the two portions (or components) of the extinction coefficient e.g. in dependence of identified precipitation type and/or precipitation intensity. The total extinction coefficient may be further converted into a visibility value. The non-precipitation related portion of the extinction coefficient is caused by hydrometeors and lithometeors that are smaller than the precipitation particles identified in the precipitation analysis, which hydrometeors and lithometeors are characterized by a significantly larger spatial distribution density. These small particles typically represent e.g. fog, mist and/or haze and have a diameter typically in the range from 1 to 50 micrometers. Light scattered from such small particles cannot be typically identified in the measurement signal as respective indications of distinct particles. Instead, scattering of light from an entity formed by a plurality of such particles residing in the measurement volume may result in a non-precipitation related component of the measurement signal, which may be derived from the measurement signal by removing (e.g. subtracting) the identified double peaks and/or identified signal events that represent frozen precipitation particles from the measurement signal. Consequently, a mean (e.g. an average) of the non-precipitation related component of the measurement signal may be applied as a measure that is descriptive of combined amount of hydrometeors and lithometeors in the measurement volume.

The forward scatter sensor 100 described herein allows separate evaluation of the precipitation particle related portion of the extinction coefficient and the non-precipitation related portion of the extinction coefficient and hence enables application of different calibration constants for the two portions. The resulting total extinction coefficient incorporates a much lower uncertainty in precipitation particle related portion of the extinction coefficient in comparison to conventional forward scatter sensors that process all components of the extinction coefficient in the same manner and hence do not enable separate calibration for the precipitation particle related and non-precipitation related portions of the extinction coefficient.

As an example in this regard, a rainfall may require 20% (percentage increases with rain intensity) smaller calibration constant for the scatter signal to extinction coefficient conversion than for example the fog requires. The identification of the precipitation related signal events described in the foregoing (which in the case of rainfall are typically double peaks identified in the measurement signal) and their elimination from the measurement signal to obtain the non-precipitation related component of the measurement signal allows to apply a factor of 0.8 to the precipitation particle related signal portion before it is converted into the precipitation related portion of the extinction coefficient to be combined with the non-precipitation related portion of the extinction coefficient to derive the total extinction coefficient that enables derivation of the visibility value.

Figure 8:
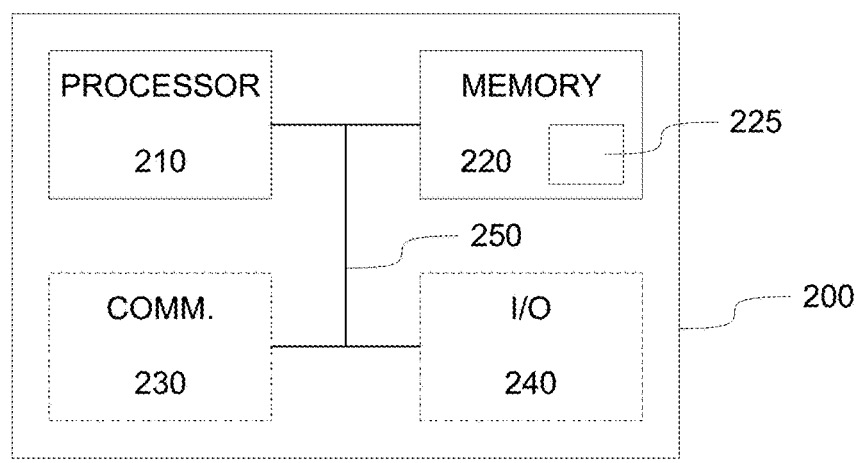
FIG. 8 illustrates a block diagram of some components of an apparatus for implementing one or more components of a control entity according an example.

FIG. 8 illustrates a block diagram of some components of an exemplifying apparatus 200, which may be employed in implementing one or more portions of the control entity 140, e.g. the controller 141 and/or the analyzer 142. The apparatus 200 may comprise further components, elements or portions that are not depicted in FIG. 8. The apparatus 200 comprises a processor 216 and a memory 215 for storing data and computer program code 217. The memory 215 and a portion of the computer program code 217 stored therein may be further arranged to, with the processor 216, to implement the function(s) described in the foregoing in context of the control entity 140, e.g. those described for the controller 141 and/or for the analyzer 142. The apparatus 200 may be referred to as a computer or a computing apparatus.

The apparatus 200 may comprise a communication portion 212 for communication with other devices. The communication portion 212 comprises at least one communication apparatus that enables wired or wireless communication with other apparatuses. A communication apparatus of the communication portion 212 may also be referred to as a respective communication means.

The apparatus 200 may further comprise user I/O (input/output) components 218 that may be arranged, possibly together with the processor 216 and a portion of the computer program code 217, to enable receiving input from a user of the apparatus 200 and/or providing output to the user of the apparatus 200 in order to control at least some aspects of operation of the forward scatter sensor 100. The user I/O components 218 may comprise hardware components such as a display, a touchscreen, a touchpad, a mouse, a keyboard, and/or an arrangement of one or more keys or buttons, etc. The user I/O components 218 may be also referred to as peripherals. The processor 216 may be arranged to control operation of the apparatus 200 e.g. in accordance with a portion of the computer program code 217 and possibly further in accordance with the user input received via the user I/O components 218 and/or in accordance with information received via the communication portion 212.

Although the processor 216 is depicted as a single component, it may be implemented as one or more separate processing components. Similarly, although the memory 215 is depicted as a single component, it may be implemented as one or more separate components, some or all of which may be integrated/removable and/or may provide permanent/semi-permanent/dynamic/cached storage.

The computer program code 217 stored in the memory 215, may comprise computer-executable instructions that control one or more aspects of operation of the apparatus 200 when loaded into the processor 216. As an example, the computer-executable instructions may be provided as one or more sequences of one or more instructions. The processor 216 is able to load and execute the computer program code 217 by reading the one or more sequences of one or more instructions included therein from the memory 215. The one or more sequences of one or more instructions may be configured to, when executed by the processor 216, cause the apparatus 200 to carry out operations, procedures and/or functions described in the foregoing in context of the control entity 140, e.g. those described for the controller 141 and/or for the analyzer 142.

Hence, the apparatus 200 may comprise at least one processor 216 and at least one memory 215 including the computer program code 217 for one or more programs, the at least one memory 215 and the computer program code 217 configured to, with the at least one processor 216, cause the apparatus 200 to perform operations, procedures and/or functions described in the foregoing in context of the control entity 140, e.g. those described for the controller 141 and/or for the analyzer 142.

The computer programs stored in the memory 215 may be provided e.g. as a respective computer program product comprising at least one computer-readable non-transitory medium having the computer program code 217 stored thereon, the computer program code, when executed by the apparatus 200, causes the apparatus 200 at least to perform operations, procedures and/or functions described in the foregoing in context of the control entity 140, e.g. those described for the controller 141 and/or for the analyzer 142. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

Although in the foregoing functions have been described with reference to certain features, those functions may be performable by other features whether described or not. Although features have been described with reference to certain embodiments, those features may also be present in other embodiments whether described or not.

The invention claimed is:

1. A forward scatter sensor for precipitation analysis, the forward scatter sensor comprising:
   a transmitter arranged to emit a light sheet;
   a receiver offset from a propagation path of the light sheet and arranged to observe light scattered from particles that fall through a measurement volume defined by an intersection of the propagation path of the light sheet and a field of view of the receiver; and
   a control entity comprising an analyzer arranged to record a measurement signal that is descriptive of intensity of light captured by the receiver as a function of time, wherein the analyzer is further arranged to:
   carry out a precipitation analysis on basis of a time segment of the measurement signal, the precipitation analysis comprising identifying, in said time segment of the measurement signal, one or more double peaks that each represent a respective droplet and comprise a first peak that represents light refracted from a bottom of the respective droplet upon entry to the measurement volume and a second peak that represents light reflected from a top of the respective droplet upon exit from the measurement volume and estimating respective droplet sizes based on said one or more double peaks;
   carry out a verification of analysis performance based on magnitudes of first peaks of at least one identified double peak and on respective residence times for said at least one identified double peak, wherein the residence time for a given double peak is defined by a time difference between the first and second peaks of the given double peak, wherein said verification comprises deriving respective first estimated sizes for droplets represented by said at least one identified double peak based on magnitude of the first peak of the respective double peak and deriving respective second estimated sizes for the droplets represented by said at least one identified double peak based on a residence time indicated by the respective double peak, wherein the residence time is defined as a time difference between the first and second peaks of the respective double peak; and
   invoke a predefined maintenance action in response to said verification indicating a threshold-exceeding difference between said first and second estimated sizes.

2. The forward scatter sensor according to claim 1, wherein invoking the predefined maintenance action comprises invoking the predefined maintenance action in response to a difference measure that is indicative of the difference between the first and second estimated sizes indicating a difference that exceeds a predefined difference threshold.

3. The forward scatter sensor according to claim 1, wherein:
   deriving the first estimated size for a droplet represented by a given double peak comprises using a first mapping function that defines a relationship between a magnitude of the first peak of a double peak and the size of a droplet represented by the double peak, and
   deriving the second estimated size for the droplet represented by the given double peak comprises using a second mapping function that defines a relationship between the residence time and the size of the droplet.

4. The forward scatter sensor according to claim 1, further comprising invoking the predefined maintenance action in response to an average ratio of the first and second estimated sizes for said at least one identified droplet exceeding a first predefined threshold or failing to exceed a second predefined threshold.

5. The forward scatter sensor according to claim 1, wherein said predefined maintenance action comprises one of the following:
   displaying an error indication via a user interface of the forward scatter sensor; or
   sending a message comprising an error indication to one or more remote devices.

6. The forward scatter sensor according to claim 1, wherein said predefined maintenance action comprises carrying out an adjustment procedure comprising:
   computing a correction factor based on an average ratio of the second and first estimated sizes for said at least one identified droplet;
   deriving a modified measurement signal by scaling the recorded measurement signal by the correction factor; and
   carrying out the precipitation analysis on basis of the modified measurement signal.

7. The forward scatter sensor according to claim 1, wherein the precipitation analysis further comprises deriving one or more precipitation parameters based at least in part on the identified one or more double peaks.

8. The forward scatter sensor according to claim 7, wherein:
   deriving one or more precipitation parameters comprises deriving an indication of a number of identified double peaks, and
   the precipitation analysis further comprises deriving one or more precipitation indications based at least in part on the one or more precipitation parameters, including deriving an indication of presence of liquid precipitation in response to the number of identified double peaks exceeding a first predefined threshold.

9. The forward scatter sensor according to claim 1, wherein identifying a double peak in the measurement signal comprises identifying, at time position ti, a first candidate peak that meets a first predefined magnitude criterion and a predefined timespan criterion in time.

10. The forward scatter sensor according to claim 9, wherein identifying a double peak in the measurement signal further comprises computing an estimated droplet size based on the magnitude of the first candidate peak by using a first mapping function that defines a relationship between a magnitude of the first peak of a double peak and the size of a droplet represented by the double peak.

11. The forward scatter sensor according to claim 10, wherein identifying a double peak in the measurement signal further comprises:
   estimating the residence time $t_r$ for the first candidate peak based on the estimated droplet size by using a second mapping function that defines a relationship between the residence time and the size of the droplet;
   identifying a second candidate peak in the measurement signal within a predefined search range around a time position $t_1+t_r$;
   if a second candidate peak having a magnitude that meets predefined criteria in relation to the magnitude of the first candidate peak is encountered within said search range, identifying the first and second candidate peaks, respectively, as the first and second peaks of a double peak; and
   if no second candidate peak having a magnitude that meets the predefined criteria in relation to the magnitude of the first candidate peak is encountered within said search range, not considering the first candidate peak as a peak belonging to a double peak.

12. The forward scatter sensor according to claim 1, wherein the transmitter is arranged to emit a single light sheet that has a thickness less than 0.5 millimeters FWHM.

13. The forward scatter sensor according to claim 1, wherein the transmitter comprises a line laser comprising:
   a laser source for emitting a light beam;
   a first lens for converting the light beam into a divergent light sheet; and
   a second lens for shaping the divergent light sheet into a single light sheet that has a reduced angle of divergence in comparison to the divergent light sheet.

14. The forward scatter sensor according to claim 1, wherein the transmitter and the receiver are arranged in a frame such that respective optical axes of the transmitter and the receiver meet each other in an angle that is in a range from 20 to 60 degrees.

15. The forward scatter sensor according to claim 1, wherein each of the transmitter and the receiver are arranged in a frame such that respective optical axes of the transmitter and the receiver are inclined downwards from a horizontal plane in angle that is in a range from 10 to 30 degrees when the forward scatter sensor is in an upright position.

16. A method comprising:
   emitting a light sheet;
   observing light scattered from particles that fall through a measurement volume defined by an intersection of a propagation path of the light sheet and a field of view;
   recording a measurement signal that is descriptive of intensity of observed light as a function of time;
   carrying out a precipitation analysis on basis of a time segment of the measurement signal, the precipitation analysis comprising:
      identifying, in said time segment of the measurement signal, one or more double peaks that each represent a respective droplet and comprise a first peak that represents light refracted from a bottom of the respective droplet upon entry to the measurement volume and a second peak that represents light reflected from a top of the respective droplet upon exit from the measurement volume; and
      estimating respective droplet sizes based on said one or more double peaks;
   carrying out a verification of analysis performance based on magnitudes of first peaks of at least one identified double peak and on respective residence times for said at least one identified double peak, wherein the residence time for a given double peak is defined by a time difference between the first and second peaks of the given double peak, wherein said verification comprises deriving respective first estimated sizes for droplets represented by said at least one identified double peak based on magnitude of the first peak of the respective double peak and deriving respective second estimated sizes for the droplets represented by said at least one identified double peak based on a residence time indicated by the respective double peak, wherein the residence time is defined as a time difference between the first and second peaks of the respective double peak; and
   invoking a predefined maintenance action in response to said verification indicating a threshold-exceeding difference between said first and second estimated sizes.

17. The method according to claim 16, wherein invoking the predefined maintenance action comprises invoking the predefined maintenance action in response to a difference measure that is indicative of the difference between the first and second estimated sizes indicating a difference that exceeds a predefined difference threshold.

18. The method according to claim 16, wherein:
   deriving the first estimated size for a droplet represented by a given double peak comprises using a first mapping function that defines a relationship between a magnitude of the first peak of a double peak and the size of a droplet represented by the double peak, and
   deriving the second estimated size for the droplet represented by the given double peak comprises using a second mapping function that defines a relationship between the residence time and the size of the droplet.

19. The method according to claim 16, wherein:
   the precipitation analysis further comprises deriving one or more precipitation parameters based at least in part on the identified one or more double peaks;
   deriving one or more precipitation parameters comprises deriving an indication of a number of identified double peaks, and
   the precipitation analysis further comprises deriving one or more precipitation indications based at least in part on the one or more precipitation parameters, including deriving an indication of presence of liquid precipitation in response to the number of identified double peaks exceeding a first predefined threshold.

20. The method according to claim 16, wherein:
   identifying a double peak in the measurement signal comprises identifying, at time position ti, a first candidate peak that meets a first predefined magnitude criterion and a predefined timespan criterion in time;
   identifying the double peak in the measurement signal further comprises computing an estimated droplet size based on the magnitude of the first candidate peak by using a first mapping function that defines a relationship between a magnitude of the first peak of a double peak and the size of a droplet represented by the double peak; and identifying the double peak in the measurement signal further comprises:

estimating the residence time $t_r$ for the first candidate peak based on the estimated droplet size by using a second mapping function that defines a relationship between the residence time and the size of the droplet;

identifying a second candidate peak in the measurement signal within a predefined search range around a time position $t_1+t_r'$ if a second candidate peak having a magnitude that meets predefined criteria in relation to the magnitude of the first candidate peak is encountered within said search range, identifying the first and second candidate peaks, respectively, as the first and second peaks of a double peak; and if no second candidate peak having a magnitude that meets the predefined criteria in relation to the magnitude of the first candidate peak is encountered within said search range, not considering the first candidate peak as a peak belonging to a double peak.

\* \* \* \* \*